(12) United States Patent
Wall et al.

(10) Patent No.: US 9,652,346 B2
(45) Date of Patent: May 16, 2017

(54) DATA CONSISTENCY CONTROL METHOD AND SOFTWARE FOR A DISTRIBUTED REPLICATED DATABASE SYSTEM

(75) Inventors: John Wall, Toronto (CA); John Paul Loeser, Toronto (CA); Khoa Tran, Oakville (CA); Marius Dan Stroe, Ajax (CA)

(73) Assignee: Symcor Inc., Mississauga (CA)

( * ) Notice: Subject to any disclaimer, the term of this patent is extended or adjusted under 35 U.S.C. 154(b) by 326 days.

(21) Appl. No.: 12/010,414

(22) Filed: Jan. 24, 2008

(65) Prior Publication Data
US 2009/0193059 A1 Jul. 30, 2009

(51) Int. Cl.
*G06F 17/30* (2006.01)
*G06F 11/20* (2006.01)

(52) U.S. Cl.
CPC ...... *G06F 11/2094* (2013.01); *G06F 11/2097* (2013.01); *G06F 17/30575* (2013.01)

(58) Field of Classification Search
CPC .................................................. G06F 17/30575
USPC .......................... 707/104.1, 201, 202, 2, 610
See application file for complete search history.

(56) References Cited

U.S. PATENT DOCUMENTS

| | | | |
|---|---|---|---|
| 6,014,669 A | 1/2000 | Slaughter et al. | |
| 6,243,715 B1 | 6/2001 | Bogantz et al. | |
| 7,076,508 B2 * | 7/2006 | Bourbonnais ..... | G06F 17/30377 707/101 |
| 7,523,118 B2 * | 4/2009 | Friedlander ....... | G06F 17/30592 707/1 |
| 2002/0010783 A1 * | 1/2002 | Primak .................. | G06F 9/505 709/226 |
| 2004/0133622 A1 | 7/2004 | Clubb et al. | |
| 2007/0143344 A1 * | 6/2007 | Luniewski ........ | G06F 17/30696 707/107 |

(Continued)

OTHER PUBLICATIONS

Bernstein, Philip A. et al., "Concurrency Control in Distributed Database Systems", Computing Surveys, Jun. 1981, pp. 185-221, vol. 13, No. 2, Computer Corporation of America, Cambridge, Massachusetts.

(Continued)

*Primary Examiner* — Chelcie Daye

(57) ABSTRACT

A distributed replicated database system having a plurality of federated database systems and methods of updating and reading database records from the distributed replicated database system are disclosed. Each federated database system contains a complete copy of a database. Moreover, each federated database system comprises at least one server divided into at least one logical partition. A logical partition contains records of the database and all logical partitions in a federated database system cumulatively stores all records in the database. A data structure is maintained which indicates whether the records in a given logical partition are up-to-date. When an update or insert request is received, the data structure is modified to indicate that all logical partitions storing a copy of the record to be updated, or partitions into which the new record is to be inserted, are not up-to-date. When the record has been updated or inserted, the data structure is modified to indicate that the logical partition storing the record is up-to-date. When a read request is received, the record is read from an up-to-date logical partition storing the record.

29 Claims, 16 Drawing Sheets

(56) References Cited

U.S. PATENT DOCUMENTS

2007/0260621 A1 11/2007 Smolen et al.
2009/0063398 A1* 3/2009 Bhatia ............... G06F 17/30536
707/2

OTHER PUBLICATIONS

Heimbigner, Dennis et al., "A Federated Architecture for Information Management", ACM Transactions on Office Information Systems, Jul. 1985, pp. 253-278, vol. 3, No. 3.

Sheth, Amit P. et al., "Federated Database Systems for Managing Distributed, Heterogeneous, and Autonomous Databases", ACM Computing Surveys, Sep. 1990, pp. 183-236, vol. 22, No. 3.

Türker, Can et al., "Using Active Mechanisms for Global Integrity Maintenance in Federated Database Systems", Workshop Föderierte Datenbanken—Kurzfassungen der Beiträgage, 1996, pp. 51-65. Otto-von-Guericke-Universitat Magdeburg, Magdeburg, Germany.

Özsu, M. Tamer, "Distributed Database Systems", Encyclopedia of Information Systems, Hossein Bidgoli (ed.), 2003, Academic Press, San Diego, CA.

Barclay, Tom et al., "TerraServer Bricks—A High Availability Cluster Alternative", Microsoft Research Technical Report MSR-TR-2004-107, Oct. 2004, pp. 1-21, Microsoft Corporation, Redmond, WA.

Grehan, Rick, "Our Series on Java-Based Object Databases Continues with a Look at Objectivity/DB", Feb. 1998, <http://www.byte.com/art/9802/sec8/art1.htm> accessed as early as Apr. 30, 2007.

"Locking and Concurrency", 1999,Objectivity, Inc., <http://wwwasd.web.cern.ch/wwwasd/lhc++/Objectivity/V5.2/Java/guide/jgdLocking.fm.html> accessed as early as Apr. 30, 2007.

Gaddam, Srinivas R., "Three-Phase Commit Protocol", Apr. 1995, <http://ei.cs.vt.edu/~cs5204/fall99/distributedDBMS/sreenu/3pc.html> accessed as early as May 11, 2007.

Lefebvre, Donald, "CIPO Communication", mailed May 9, 2016, in Canadian Patent Application No. 2,618,938.

Bush, "Database architecture: Federated vs Clustered", An Oracle White Paper, Feb. 2002.

McLeod et al., "A Federated Architecture for Information Management", ACM Transactions on Information Systems vol. 3, Issue 3, 1985, pp. 253-278.

McLeod et al., "A Federated Architecture for Database Systems", National Computer Conference, 1980, pp. 283-289.

* cited by examiner

| Database System 1 | | | |
|---|---|---|---|
| Server # | Partition # | State | |
| Server 1 | Partition 1 | A | 76 |
| Server 1 | Partition 2 | D | 78 |
| Server 1 | Partition 3 | A | 80 |
| Server 2 | Partition 4 | U | 82 |
| Server 2 | Partition 5 | A | 84 |
| Server 2 | Partition 6 | D | 86 |

FIG. 7A

| Database System 2 | | |
|---|---|---|
| Server # | Partition # | State |
| Server 1 | Partition 1 | A |
| Server 1 | Partition 2 | D |
| Server 1 | Partition 3 | A |
| Server 2 | Partition 4 | U |
| Server 2 | Partition 5 | A |
| Server 2 | Partition 6 | D |

FIG. 7B

| Database System 3 | | |
|---|---|---|
| Server # | Partition # | State |
| Server 1 | Partition 1 | A |
| Server 1 | Partition 2 | A |
| Server 2 | Partition 3 | A |
| Server 2 | Partition 4 | A |
| Server 3 | Partition 5 | D |
| Server 4 | Partition 6 | U |

FIG. 7C

| Database System 4 | | | |
|---|---|---|---|
| Server # | Partition # | State | |
| Server 1 | Partition 1 | A | |
| Server 2 | Partition 2 | A | |
| Server 3 | Partition 3 | A | |
| Server 4 | Partition 4 | D | |
| Server 5 | Partition 5 | A | |
| Server 6 | Partition 6 | U | |

| Database System 5 | | |
|---|---|---|
| Server # | Partition # | State |
| Server 1 | Partition 1 | A |
| Server 1 | Partition 2 | D |
| Server 2 | Partition 3 | D |
| Server 2 | Partition 4 | D |
| Server 3 | Partition 5 | A |
| Server 3 | Partition 6 | U |

| Database System 1 | | | | |
|---|---|---|---|---|
| Server # | Partition # | Record ID Start | Record ID End | |
| Server 1 | Partition 1 | 0000 | 0100 | —100 |
| Server 1 | Partition 2 | 0101 | 0205 | —102 |
| Server 1 | Partition 3 | 0206 | 0389 | —104 |
| Server 2 | Partition 4 | 0390 | 0450 | —106 |
| Server 2 | Partition 5 | 0451 | 0898 | —108 |
| Server 2 | Partition 6 | 0899 | 1000 | —110 |

FIG. 8A

| Database System 2 – Mirror of Database System 1 Data | | | |
|---|---|---|---|
| Server # | Partition # | Record ID Start | Record ID End |
| Server 1 | Partition 1 | 0000 | 0100 |
| Server 1 | Partition 2 | 0101 | 0205 |
| Server 1 | Partition 3 | 0206 | 0389 |
| Server 2 | Partition 4 | 0390 | 0450 |
| Server 2 | Partition 5 | 0451 | 0898 |
| Server 2 | Partition 6 | 0899 | 1000 |

FIG. 8B

| Database System 3 | | | |
|---|---|---|---|
| Server # | Partition # | Record ID Start | Record ID End |
| Server 1 | Partition 1 | 0000 | 0100 |
| Server 1 | Partition 2 | 0101 | 0205 |
| Server 2 | Partition 3 | 0206 | 0389 |
| Server 2 | Partition 4 | 0390 | 0450 |
| Server 3 | Partition 5 | 0451 | 0898 |
| Server 4 | Partition 6 | 0899 | 1000 |

FIG. 8C

| Database System 4 | | | | |
|---|---|---|---|---|
| Server # | Partition # | Record ID Start | Record ID End | |
| Server 1 | Partition 1 | 0000 | 0100 | |
| Server 2 | Partition 2 | 0101 | 0205 | |
| Server 3 | Partition 3 | 0206 | 0389 | |
| Server 4 | Partition 4 | 0390 | 0450 | |
| Server 5 | Partition 5 | 0451 | 0898 | |
| Server 6 | Partition 6 | 0899 | 1000 | |

FIG. 8D

| Database System 5 | | | |
|---|---|---|---|
| Server # | Partition # | Record ID Start | Record ID End |
| Server 1 | Partition 1 | 0000 | 0100 |
| Server 1 | Partition 2 | 0101 | 0205 |
| Server 2 | Partition 3 | 0206 | 0389 |
| Server 2 | Partition 4 | 0390 | 0450 |
| Server 3 | Partition 5 | 0451 | 0898 |
| Server 3 | Partition 6 | 0899 | 1000 |

FIG. 8E

DATA CONSISTENCY CONTROL METHOD AND SOFTWARE FOR A DISTRIBUTED REPLICATED DATABASE SYSTEM

FIELD OF THE INVENTION

The present invention relates generally to concurrency control in a distributed replicated database system, and more particularly to maintaining data consistency in a replicated database system comprising a plurality of federated databases.

BACKGROUND OF THE INVENTION

Modern computer data storage applications rely on the storage of high volumes of data in a redundant, fault tolerant manner. For example, archiving of document images requires such storage.

To this end, databases that are distributed and allow for redundancy are known. Typically, the database is hosted on multiple physical computers, and is either replicated or mirrored. In this way, multiple instances of the data or even the entire database may be maintained. In the event one instance of the database fails, or is lost, the other instance may be accessed.

One known database architecture designed for the storage of large amounts of data, integrates multiple autonomous database systems into a single database—referred to as a federated database. In this way, conventional smaller databases using readily available software and hardware may be arranged to co-operate and be combined to form a single, larger logical database. Federated databases are, for example, described in McLeod and Heimbigner (1985). "*A Federated architecture for information management*". *ACM Transactions on Information Systems Vol 3, Issue 3:* 253-278, and "Sheth and Larson" (1990). "*Federated Database Systems for Managing Distributed, Heterogenous and Autonomous Databases*". *ACM Computing Surveys Vol 22, No. 3;* 183-236, and Barclay, T., Gray, J., and Chong W., "TerraServer Bricks—A High Availability Cluster Alternative" (2004), Microsoft Research Technical Report MSR-TR-2004-107.

As data is replicated across multiple instances of the databases, maintaining coherency between the instances of the database, and ensuring that only up-to date data is used presents challenges. These challenges become more pronounced, in a federated database as the number of autonomous database systems increases.

Accordingly, there remains a need for methods, and software for maintaining data consistency in a replicated database system formed from one or more federated databases.

SUMMARY OF THE INVENTION

In accordance with an aspect of the invention, there is provided a distributed replicated database system storing a database having a plurality of records. The database system comprises a plurality of federated database systems. Each of the federated database systems stores a complete copy of the database. Each federated database system comprises at least one server with the at least one server divided into at least one logical partition. The at least one logical partition contains records in the database and all logical partitions at a federated database system cumulatively stores all records in the database. A computing device hosts an application for updating the distributed replicated database system. The computing device is in communication with a computer readable medium storing a data structure, the data structure containing an indicator for each logical partition in each of the federated database systems of the database system. Each indicator indicates whether records in a given logical partition are up-to-date.

In accordance with yet another aspect of the invention, there is provided a method of updating a record in the distributed replicated database system, as disclosed herein, the method comprising: receiving an instruction to update a record; identifying from a data structure all logical partitions in the replicated database system storing the record; and modifying the data structure to indicate that all the logical partitions storing the record are not up-to-date.

In accordance with yet another aspect of the invention, there is provided a method of reading a record in the distributed replicated database system, as disclosed herein, the method comprising: at a first federated database system, receiving an instruction to read a record; identifying from a data structure an up-to-date logical partition storing the record; and reading the record from a server storing the up-to-date logical partition.

In accordance with another aspect of the invention, there is provided a method of inserting a record in the distributed replicated database system, as disclosed herein, the method comprising: receiving an instruction to insert a record; identifying all logical partitions in the replicated database system into which the new record is to be inserted; and modifying the data structure to indicate that all the logical partitions into which the new record is to be inserted are not up-to-date.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 7A to 7E illustrate an exemplary format of a state table for the database system of FIG. 1;

FIGS. 8A to 8E illustrate an exemplary format of a table associating database records with logical partitions in the database system of FIG. 1;

DETAILED DESCRIPTION

Figure 1:
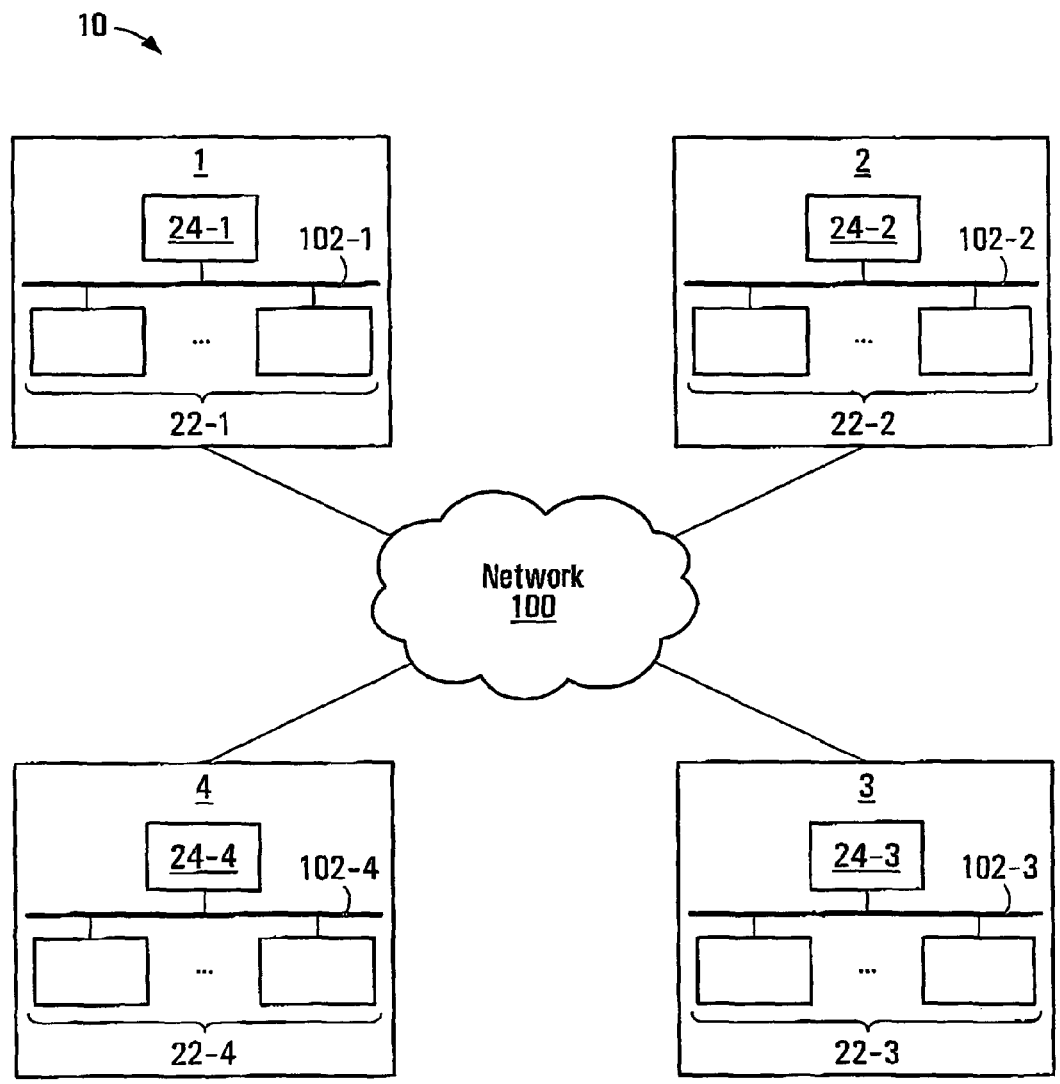
FIG. 1 is a simplified block diagram of a database system, including a plurality of federated database systems, exemplary of an embodiment of the present invention.

FIG. 1 depicts a database system 101 exemplary of an embodiment of the present invention. Database system 10 is formed from a plurality of independent federated database systems, namely, federated database system 1, federated database system 2, federated database system 3 and federated database system 4, all interconnected by way of computer communications network 100. Network 100 may be a wide area network or may be a local area network (packet switched, token ring, or other computer communications network, known to those of ordinary skill). Conveniently, federated database systems 1, 2, 3 and 4 may be interconnected by way of the Internet and may be geographically remote from one another.

As may be appreciated by those of ordinary skill, a database system includes a database (i.e. a structured collection of data ("records")) and software for managing the database, typically referred to as a database management system (DBMS). Known DBMSs include, for example, Oracle and Microsoft SQL database systems. A database system may be centralized, with a single DBMS managing a single database residing on the same computer system. Likewise, a database system may be distributed, with a single DBMS managing multiple databases possibly residing on several different computer systems. Within a database system, data may be replicated, to avoid data loss in the presence of a physical or logical failure or a component of the database system; such a system may be considered a replicated database system.

A federated database system is a collection of several autonomous database systems managed by a federated database management system (FDBMS) software. The component databases in a federated database system may be autonomous (i.e. each component database may function as a stand-alone database system) but may cooperate in the federated database system to allow sharing of data between component database systems in the federated database system.

In a federated database, data is accessed through the FDBMS, which in turn makes use of one or more of the DBMS of the component databases. To end users, the presence of the component databases (and DBMS) is typically entirely transparent.

In the database system of FIG. 1, each of federated database systems 1, 2, 3 and 4 may be hosted on a plurality of computer systems 22 hosting component autonomous database systems, and one or more computer systems 24 hosting the FDBMS controlling the federated database system. For example, federated database system 1 may have a plurality of computer systems 22-1 hosting component autonomous database systems. Each of the component autonomous database systems hosted on computer systems 22-1 may cooperate to form federated database system 1. Computer system 24-1 may host the FDBMS through which the component federated databases residing on computer systems 22-1 may be accessed. Computer systems 22 and 24 in each of federated database system 1, 2, 3 and 4 may be interconnected by way of a computer communications network 102, such as a local area network or a wide area network.

As depicted, exemplary database system 10 has four component federated database systems 1, 2, 3, 4; however, it may be appreciated that database system 10 may have less or more than four component database systems. As will become apparent, each federated database system 1, 2, 3 and 4 hosts an instance of a database. As such, the entire database is replicated four times, once on each federated database system 1, 2, 3 and 4.

Moreover, as depicted, database systems 1, 2, 3 and 4 may be autonomous federated database systems, each having its own FDBMS. However, it may be appreciated that the functionality of one FDBMS may be shared across more than one of database systems 1, 2, 3 and 4, such that one FDBMS may function as an FDBMS for more than one of the database systems.

Figure 2:
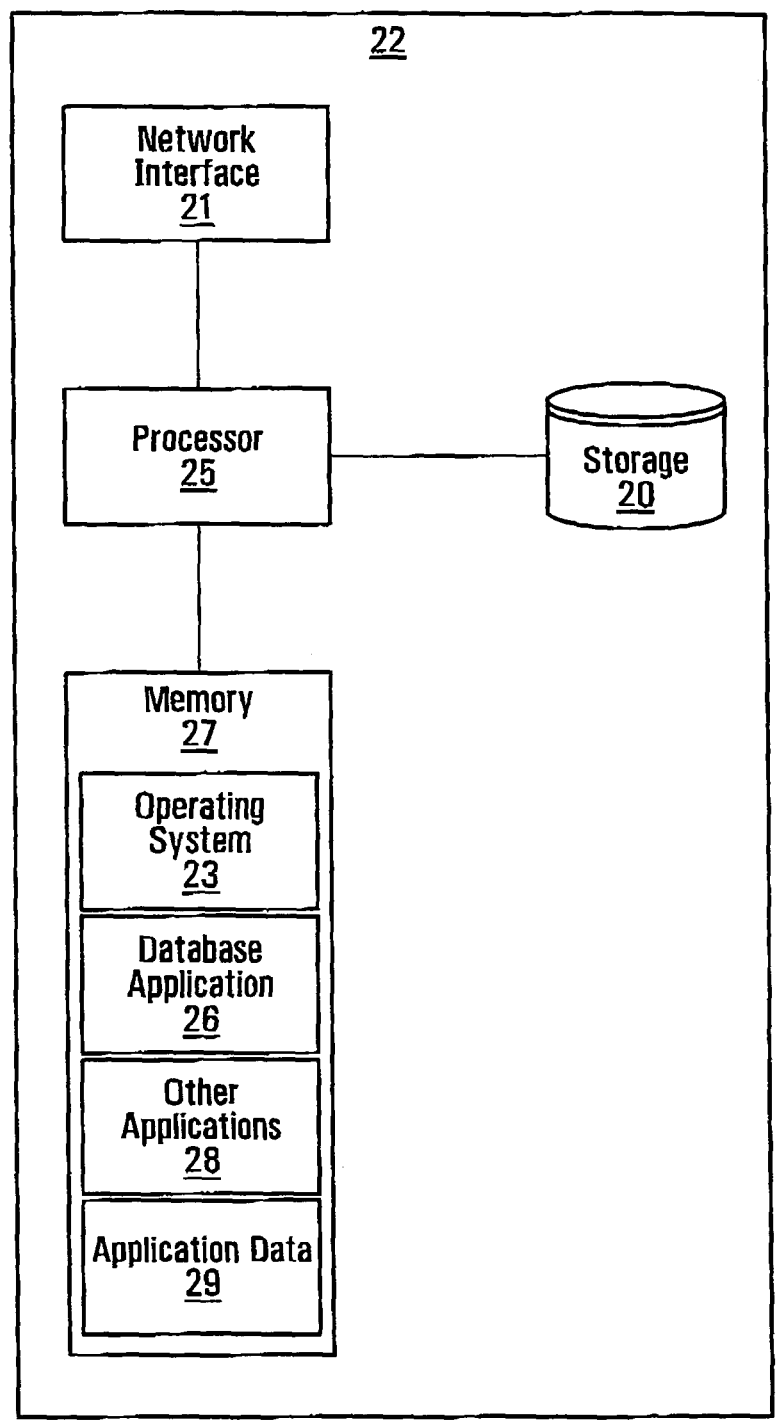
FIG. 2 is a block diagram depicting the contents of temporary and persistent memory storage of a computer system in the database system of FIG. 1.

As illustrated in FIG. 2, each of computer systems 22-1 to 224 of FIG. 1 may be a conventional computer system having a processor 25, a network interface 21, storage device 20, and memory 27 hosting operating system 23, such as Windows XP, Vista, Linux, or Apple OSX, database application 26, other applications 28 and application data 29. Other applications 28 may include conventional applications typically running on conventional computer systems (e.g. word processing applications). Database application 26 may be a database management system (DBMS). Known database management systems include, for example, Oracle™, MicrosoftSQL™, and xBase database systems. Processor 25 may execute operating system 23, database application 26 and other applications 28. Network interface 21 may be any conventional piece of hardware, such as an Ethernet card, token ring card, etc. that allows computer system(s) 22 to communicate over networks 100 and 102

Figure 3:
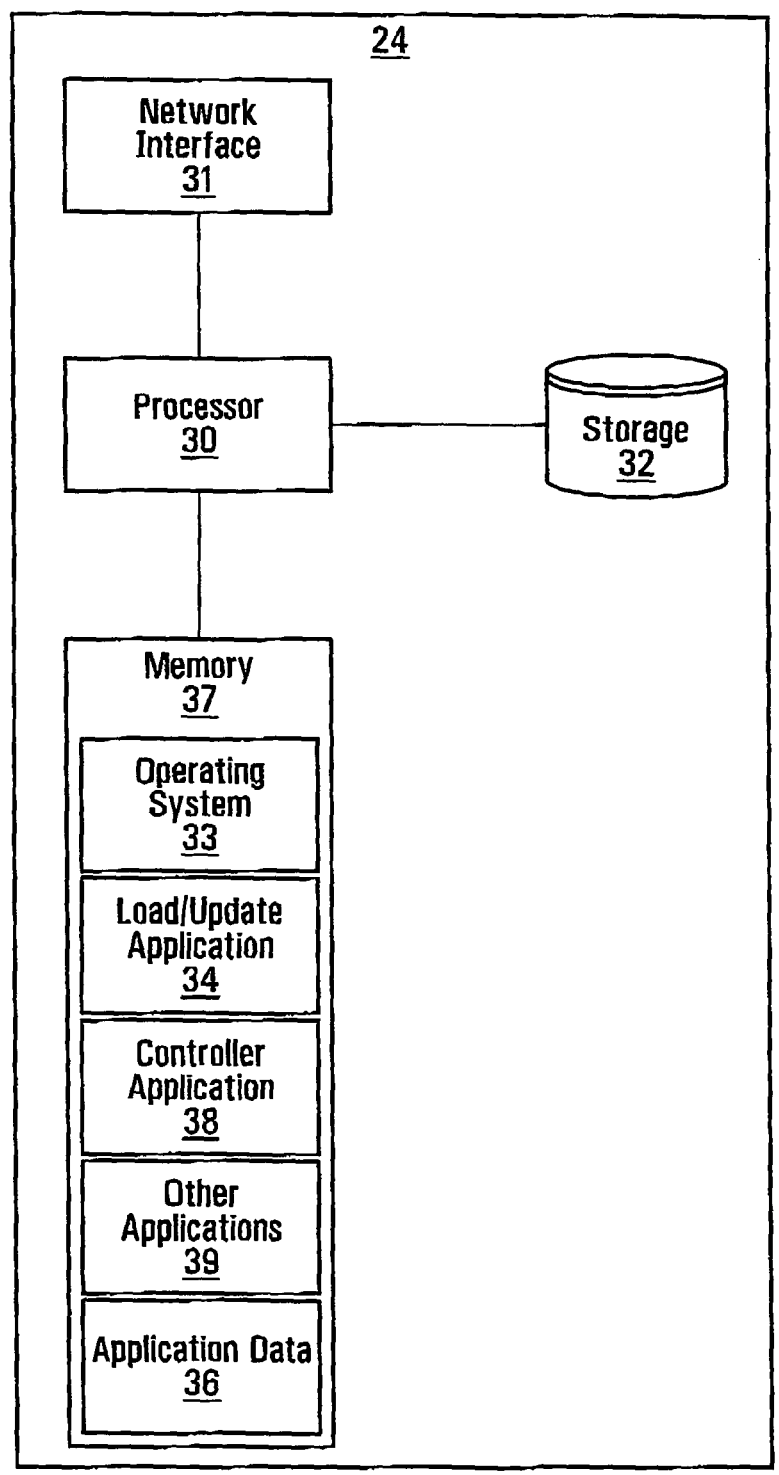
FIG. 3 is a block diagram depicting the contents of temporary and persistent memory storage of a computer system hosting various database applications in the database system of FIG. 1.

Each of computer systems 24-1 to 24-4 may be similar to computer system(s) 22 and may also be a conventional computer system (FIG. 3). Briefly, computer system 24 may include a processor 30, a network interface 31, storage device 32, and memory 37 hosting operating system 33, other applications 39 and application data 36. However, computer system 24 may further host load/update application 34 and controller application 38.

In particular, controller application 38 and load/update application 34 may receive, over network 100 queries and update requests directed to the copy of database 40 stored at database systems 1, 2, 3 and 4 respectively. Also, data may be sent to and from database systems 1, 2, 3, and 4 over network 100 by way of load/update application 34 and controller application 38. Specifically, controller application 38 may service read requests and load/update application 34 may service insert and update requests. In the course of servicing inserts and updates, load/update application 34 may change states in the system state table(s), as will be further described below.

As discussed above, data may sometimes be replicated in a database system. A replicated database system may be desired so that, for example, the database system is tolerant of hardware failures, for example, hard disk failures resulting in corruption of data. Moreover, it may be desired to replicate data so that one or more other copies of data may be accessible should the primary copy, or the copy that is to be accessed, be unavailable.

Figure 4:
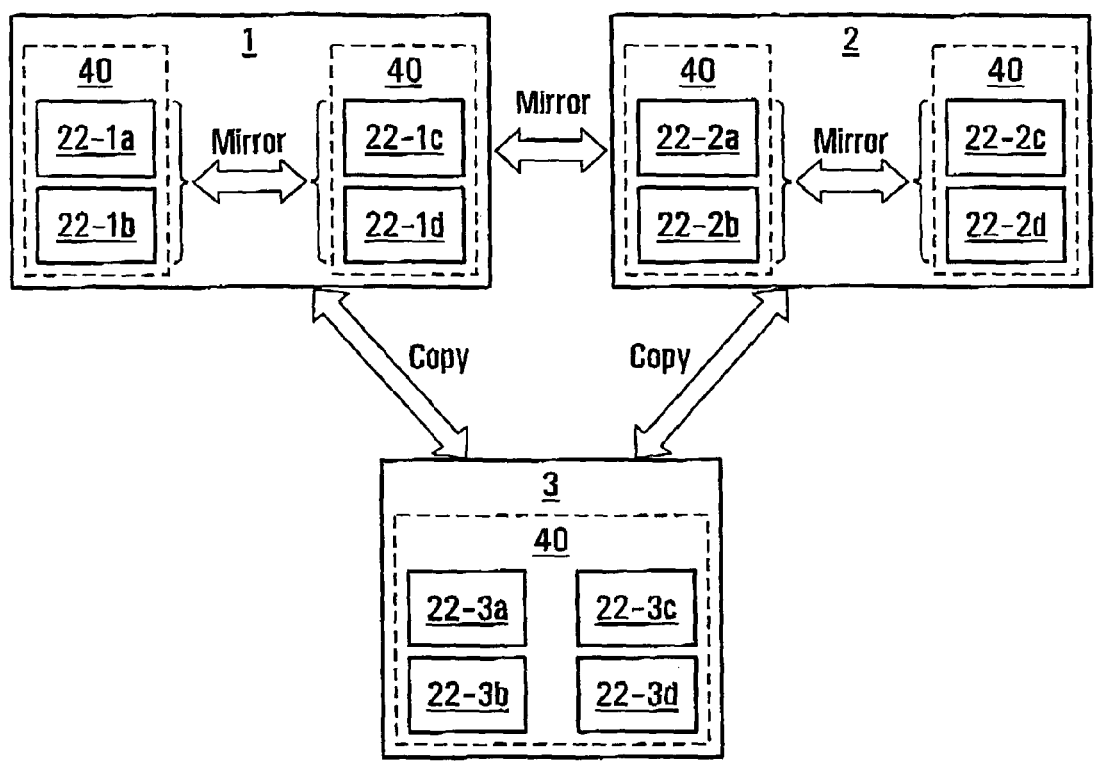
FIG. 4 is a block diagram illustrating the relationship between the data stored at selected federated database systems in the database system of FIG. 1.

FIG. 4 depicts an exemplary data replication scheme across selected federated database systems in database system 10 (namely, database systems 1, 2, and 3). In an exemplary embodiment of database system 10, each of federated database systems 1, 2 and 3 stores a complete instance of a database 40. Thus, data is replicated across database systems 1, 2 and 3. However, data may also be replicated within each of database systems 1, 2 and 3 as described below.

Exemplary database system 1 includes computer systems 22-1a, 22-1b, 22-1c and 22-1d (FIG. 4). Database 40 may be distributed across computer systems 22-1a and 22-1b such that computer systems 22-1a and 22-1b stores some but not all of database 40, but together, computer systems 22-1a and 22-1b store all of database 40. As noted, computer system 22-1a may itself host an autonomous centralized database system, controlled by database application 26. Similarly, computer system 22-1b may itself host an autonomous centralized database system, controlled by database application 26. The two autonomous database systems hosted on computer systems 22-1a and 22-1b may be linked together, over network 102-1, to form federated database system 1 (FIG. 1).

Data on computer systems 22-1a and 22-1b may be mirrored on computer systems 22-1c and 22-1d. As may be appreciated by those of ordinary skill, data mirroring is a technique wherein identical copies of data are stored on separate storage devices (e.g. the second physical copy of the data is identical to the primary copy). Also, as one of ordinary skill may appreciate, multiple techniques for mirroring data exist. For example, data may be mirrored to storage devices in computer systems 22-1c and 22-1d using the redundant array of independent drives (RAID) scheme. Thus, in this manner, database system 1 itself hosts two complete copies of database 40.

Moreover, data may also be mirrored across database systems 1 and 2, allowing each of computer systems 22-2a and 22-2b to store a complete copy of database 40 with data on computer systems 22-2a and 22-2b mirrored on storage devices of computer systems 22-2c and 22-2d. Thus, database system 2 also contains two complete copies of database 40. Conveniently, transactions performed on a copy of database 40 may immediately be propagated to mirrored copies of database 40 in a manner known to those skilled in the art.

Federated database system 3, at computer systems 22-3a, 22-3b, 22-3c and 22-3d, also stores a complete copy of database 40; however, database 40 at database system 3 may be structured differently than at database systems 1 and 2. Specifically, the data of database 40 may be physically distributed across computer systems 22-3a-d differently from how it is distributed across computer systems 22-1a and 22-1b (and mirrored systems 22-1c and 22-1d, 22-2a and 22-2b, and 22-2c and 22-2d). An exemplary way of maintaining coherency of the copy of database 40 in database system 1 with the copy of database 40 in database system 3 is for database system 3 to perform the same database transactions (e.g. inserts, updates and deletes) on its copy of database 40 as was performed at database system 1. As a result, the copy of database 40 at database system 3 may contain identical data to the copy of database 40 at computer system 1, though the data may be physically structured differently.

As previously noted, within each of database systems 1, 2, 3 and 4, database 40 may be physically distributed across several computer systems 22, and more specifically, across several different autonomous database systems Schemes for distributing a database across several different computer systems, and across several database systems, may be known to those of ordinary skill.

In addition to physically distributing the data across several computer systems 22, database 40 may also be logically partitioned. Conveniently, at a particular physical computer system, the data may be further partitioned into logical partitions. Consequently, database 40 may be both physically and logically distributed as further detailed below.

Figure 5:
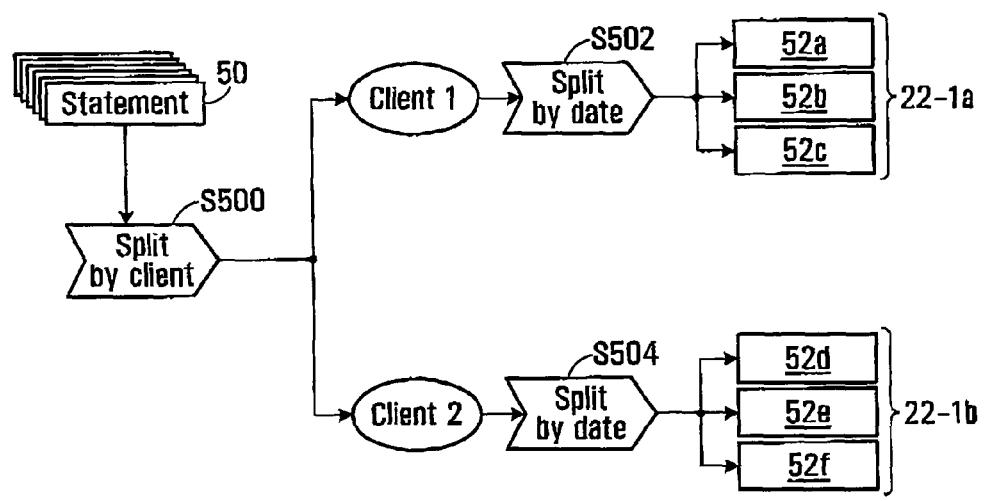
FIG. 5 is a block diagram illustrating exemplary logical partitioning of data to be stored in a federated database system in the database system of FIG. 1.

For purposes of illustration, FIG. 5 depicts exemplary partitioning of data in database 40, into a plurality of logical partitions 52a-52f (i.e. six logical partitions), and physically distributing those logical partitions 52a-62f across two computer systems, such as computer systems 22a and 22b (FIG. 4). In the depicted embodiment, exemplary database 40 may be a structured collection of financial statement data 50. Further, financial statement data 50 may have at least two attributes: a client name and a transaction date. Using these two attributes, statement data 50 may be partitioned into logical partitions 52a-52f as follows.

First, statement data 50, containing financial transaction data for two clients, Client 1 and Client 2, may be split or divided by client name (FIG. 5, S500). Statement data 50 may further be divided into two groups, one corresponding to Client 1's statement data and the other corresponding to Client 2's statement data.

Client 1's statement data may be further divided by date (FIG. 5, S502), and likewise Client 2's statement data (FIG. 5, S504). For example, each of Client 1 and Client 2's statement data may be divided into transactions taking place during the first third of the year (placed into logical partition 52a for Client 1 or partition 52d for Client 2), the second third of the year (placed into logical partition 52b for Client 1 or partition 62e for Client 2) and the last third of the year (placed into logical partition 52c for Client 1 or partition 52e for Client 2). Logical partitions 52a to 52c may be stored on computer system 22-1a, and logical partitions 52d to 52f stored on computer system 22-1b.

As previously explained, computer systems 22-1a and 22-1b may each host an autonomous database system. Thus, records contained in logical partitions 52a to 52c may be stored in an autonomous database system hosted on computer system 22-1a. Likewise, records contained in logical partitions 52d to 52f may be stored in an autonomous database system hosted on computer system 22-1b. In this manner, statement data 50 is logically distributed across six logical partitions (i.e. 52a-52f) and those six logical partitions physically distributed across two computer systems (i.e. 22-1a and 22-1b), each hosting an autonomous database system. It may also be apparent that each of logical partitions 52a-52f contains a subset of the records of database 40, and cumulatively, partitions 52a-52f contain all of the records of database 40.

Moreover, as shown in FIG. 4, the six logical partitions 52a-52f may be physically distributed across four computer systems 22-3a, 22-3b, 22-3c, and 22-3d in database system 3. Of course, other manners of dividing and distributing statement data 50 may also be employed.

As noted, maintaining concurrency in distributed databases is often difficult. Specifically, multiple users may attempt to access database 40 at one time and difficulties may arise when a user attempts to read a record in database 40 at the same time that an update operation is occurring on that record. Different algorithms or techniques to address these difficulties have been proposed and are known to those of ordinary skill. For example, locks may be employed to lock the record that is being updated so that no other users may access (e.g. read) the record. Disadvantageously, if there is only one copy of the record in the database system, all other users must wait for the update operation to complete before their read requests may be completed.

In the case of a replicated distributed database, when a particular record is being updated, other users trying to access (e.g. read) that record may be directed to other copies of the record in database system 10. However, when a particular copy of a record is being, or has been, updated but that update has not yet been propagated to other copies of the record those other copies of the record may not reflect the most recent update to the record.

Figure 6:
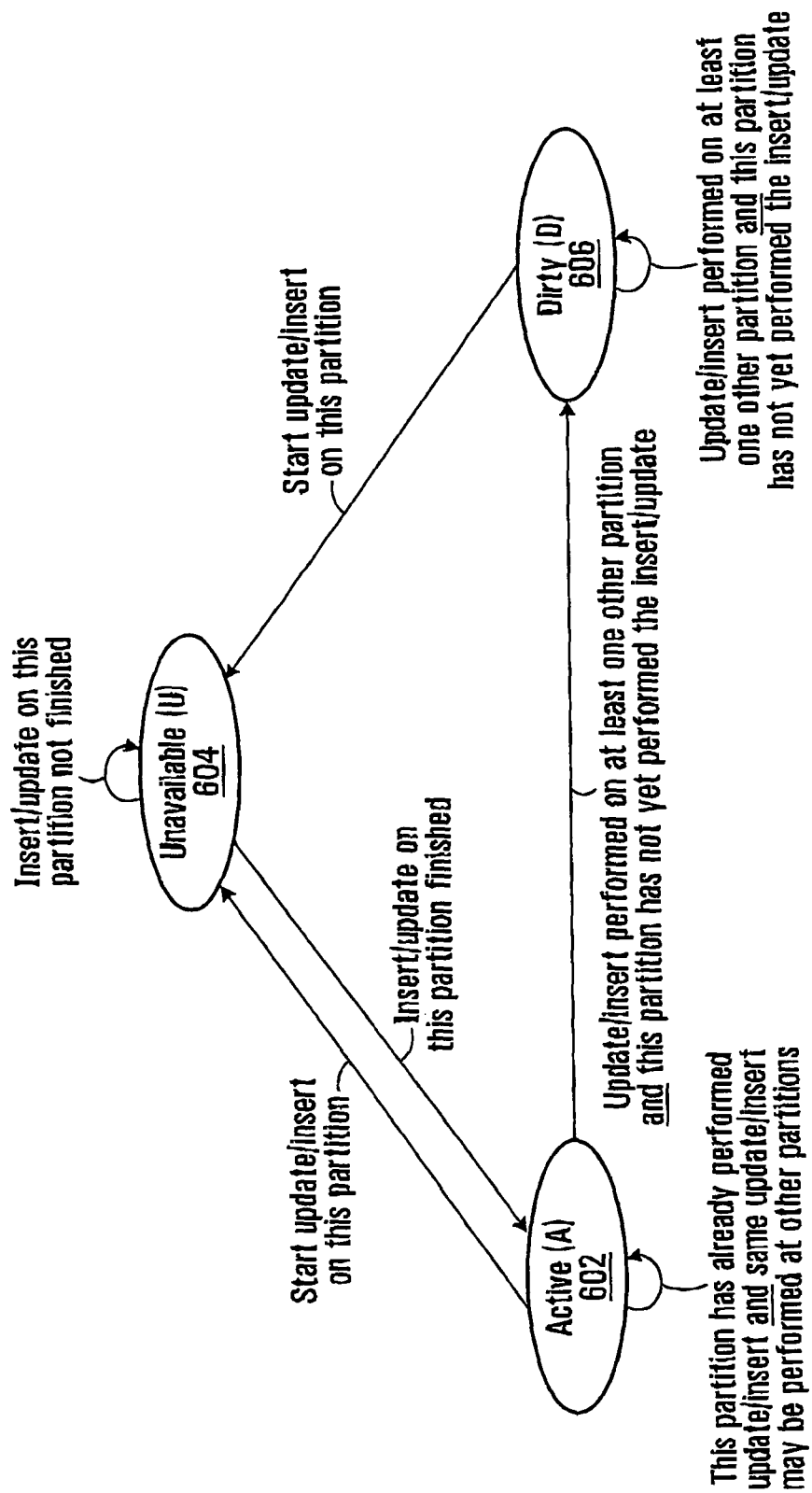
FIG. 6 is a state diagram illustrating exemplary states of a logical partition in the database system of FIG. 1.

To this end, a method of concurrency control exemplary of an embodiment of the present invention will be explained with reference to FIGS. 6 to 14. Significantly, one of three states may be associated with each logical partition in database system 10. A state diagram showing the three states, active (A) state 602, unavailable (U) state 604, and dirty (D) state 606, and state transitions is illustrated in FIG. 6.

A partition may be in an active state 602 when its component records reflect the most recent update to database 40. A partition may be in the dirty state 606 when an update has been performed at an equivalent partition (i.e. another partition containing a copy of at least one record in the partition) but the partition has not yet been updated (i.e. the component records in the partition do not reflect the most recent update to database 40), or when a new record is awaiting insertion into the partition. A partition may be in the unavailable state when one or more of its component records is in the process of being updated or new records are being inserted. When a partition is in the unavailable state 604, component records may not be accessed (e.g. read).

A partition may remain in an active state 602 while its component records still reflect the most recent update to database 40. Moreover, a partition may transition from the active state 602 to the unavailable state 604 when an update operation is initiated on one or more of its component records or record are being inserted into the partition. A partition may transition from the active state to the dirty state 606 when an update is being, or has been, performed on an equivalent partition (i.e. another partition containing a copy of the subject record) but the partition has not yet performed the update, or when the partition is awaiting insertion of new records.

A partition may remain in a dirty state 606 while the partition continues to not reflect the most recent update to database 40 (i.e. either because the partition has not yet been updated, or because the partition is awaiting insertion of records). A partition may transition from the dirty state 606 to an unavailable state 604 when an update or insert operation is initiated on one or more records at that partition.

A partition may remain in an unavailable state 604 when the insert or update operation on more or more of its component records remains in progress. Upon completion of the update/insert, the partition may transition from an unavailable state 604 back to an active state 602.

Conveniently, the state of each logical partition in database system 10 may be tracked using state tables. FIGS. 7A to 7E illustrate an exemplary format of a state table for the partitions in database systems 1-5. Specifically, each of state tables 70, 72 and 74 may associate each partition with a server and a state.

As more specifically detailed in FIG. 7A, state table 70 for database system 1 has six logical partitions (identified as Partition 1-Partition 6) distributed across two computer systems, 22-1a (identified as Server 1) and 22-1b (identified by Server 2). Each computer system on which a logical partition resides may act as a server, which server performs the function of accepting operation requests (e.g. read/update/insert requests) and returning the requested information (e.g. database records). Thus, if it is desired, for example, to access Partition 1 in database system 1, an access request may be directed to Server 1 in database system 1 over networks 100 and/or network 102. Hereinafter, a logical partition may be considered to reside on a particular physical server (i.e. "Server X" is a way of identifying which computer system the records of a partition resides upon). Also, as previously explained, each of the partitions may be in one of three states: active, dirty and unavailable.

A component record of a partition may be read via controller application 38, and updated via load/update application 34 for the database system. Moreover, a new record may be inserted into a partition via load/update application 34. In particular, controller applications 38 and load/update application 34 may pass the read/update/insert request to the database application 26 of the database system storing the record.

Returning to FIG. 7A, the six logical partitions of the instance of database 40 stored in database system 1 is distributed across two servers (corresponding to computer systems 22-1a and 22-1b in FIG. 5). More specifically, row 76 of state table 70 specifies that Partition 1 resides on Server 1 and is in the active state; row 78 specifies that Partition 2 resides on Server 1 and is in the dirty state; row 80 specifies that Partition 3 resides on Server 1 and is in the active state; row 82 specifies that Partition 4 resides on Server 2 and is in the unavailable state; row 84 specifies that Partition 5 resides on Server 2 and is in the active state; and row 86 specifies that Partition 6 resides on Server 2 and is in the dirty state.

FIG. 7B, depicting state table 72 for database system 2, is identical to state table 70 because the copy of database 40 stored in database system 2 is a mirrored copy of database 40 stored in database system 1.

FIG. 7C depicts state table 74 for database system 3. As previously discussed, the instance of database 40 stored in database system 3 may be structured differently than at database system 1. Specifically, the six logical partitions of database 40 may be distributed over four servers. As shown, the instances, at database system 3, of Partitions 1, 2, 3 and 4 are in the active state, Partition 5 in the dirty state and Partition 6 in the unavailable state.

FIG. 7D depicts state table 81 for database system 4. The six logical partitions of the instance of database 40 stored at database system 4 may be distributed over six servers. As shown, Partitions 1, 2, 3 and 5 are in the active state, and Partitions 4 and 6 in the dirty and unavailable states respectively.

FIG. 7E depicts state table 83 for database system 5. The six logical partitions of the instance of database 40 stored at database system 5 may be distributed across three servers. Partitions 1 and 5 are in the active state, Partitions 2, 3 and 4 are in the dirty state and Partition 6 is in the unavailable state.

It may be appreciated that FIGS. 7A to 7E depict the states of partitions in database systems 1, 2, 3, 4 and 5 at a point in time and that the state of any one of the partitions may change to another state if an event occurs that prompts a state transition (FIG. 6).

FIGS. 8A to 8E depict an exemplary format for partition tables 90, 92, 94, 96 and 98 corresponding to database systems 1, 2, 3, 4 and 5 (not shown in FIG. 1) respectively. Tables 90, 92, 94, 96 and 98 specify for each logical partition start and end record identifiers for the component records of the partition. A record identifier may be a unique number assigned to each record (e.g. a primary key) providing means by which a record may be uniquely identified. In this example, the record identifier is an ordinal number, however, it may be appreciated that other unique record identifiers may be employed (e.g. client account number, clients social insurance number, client name, etc.). Also, it may be appreciated that other manners of identifying partitions, other than by number, may also be employed.

Referring to table 90 in FIG. 8A, row 100 specifies that Partition 1 contains records having record identifiers 0000-0100; row 102 specifies that Partition 2 contains records having record identifiers 0101-0205; row 104 specifies that Partition 3 contains records having record identifiers 0206-0389; row 106 specifies that Partition 4 contains records having record identifiers 0390-0450; row 108 specifies that Partition 5 contains records having record identifiers 0451-0898; and row 110 specifies that Partition 6 contains records having record identifiers 0899-1000.

Although as described, two tables are kept for each database system (e.g. for database system 1, state table 70 and partition table 90), the two tables may be joined into one (i.e. a table having the fields Server No., Partition No. State, Record ID Start, and Record ID End). Moreover, separate tables need not be kept for each database system, but rather, one table for all the partitions in database system 10 may be kept. That is, tables 70, 72, 74, 81, 83, 90, 92, 94, 96 and 98 may be joined into one table.

Tables 70, 72, 74, 81, 83, 90, 92, 94, 96 and 98, or the single table if joined into one table, (collectively "system state table" may be stored at one of computer systems 22 or (at another computing device, not shown) at each of database systems 1, 2, 3, 4 or 5. Alternatively, one copy of the table(s) may be kept at a location accessible to controller applications 38 and load/update applications 34, for example, at one of computer systems 22 at each of database systems 1, 2, 3, 4 or 5 to which all other controller applications 38 and load/update applications 34 in database system 10 have access (over network 100 and/or network 102).

In operation and with reference to FIGS. 9 to 12, assume that a user of database system 10 desires to obtain an exemplary record having record identifier 0396. An appropriate query (e.g. the query may originate as an XML request, and then translated into an SQL statement) may be directed to the controller application 38 over network 100 hosted on one or more of computer system(s) 22, of one of database systems 1, 2, 3, 4 or 5. The query may, for example, be generated by an application making use of system 22. The application could, for example, be a document or data archiving application, an accounting application, or any other application requiring storage of data on database 40.

Flow diagram 9000 (FIG. 9) depicts operation of controller application 38 upon receiving a read request. First, controller application 38 may receive a read request for a record ID 0396 (S9002), from e.g. another application. Using partition table 90 (row 106), controller application 38 may determine that record ID 0396 is stored on Partition 4 residing on Server 2 (S9004). Controller application 38 may then determine from state table 70 whether Partition 4 is available (S9006). As illustrated, Partition 4 is in an unavailable state (table 70, row 106). If, however, Partition 4 is in an active state, then controller application 38 may return record ID 0396, by e.g. sending a request to database application 26 hosted on Server 2, in a manner understood by those skilled in the art.

However, in the present example, since Partition 4 is in an unavailable state (indicating, for example, that one or more records in Partition 4 may be in the process of being updated or inserted) controller application 38 may identify another instance of Partition 4 (either within database system 1, or another one of database systems 2, 3, 4, or 5) (S9012). Operation continues until controller application 38 identifies an available instance of Partition 4 from which record 0396 may be read.

At step S9012, controller application 38 may identify another instance of Partition 4 by consulting the system state table. For example, controller application 38 may identify from the system state table that other instances of Partition 4 exist on Servers 2 in database systems 2, 3, and 5, and on Server 4 in database system 4 (FIGS. 8B-8E). Notably, the instance of Partition 4 in database system 3, hosted on Server 2, is in the available state. Accordingly, controller application 38 may send a read request for record 0396 to database application 26 hosted on Server 2 in database system 3 (or controller application 38 for database system 3) (S9010).

Also notably, if there is a failure (e.g. of hardware or software) at a particular database system, controller application 38 may redirect a read request to another database application 26 in another database system, and that other database application 26 may service the read request. Example failures may include network failures, physical failures (e.g. of the server hosting the desired partition), or software failures. When an instance of controller application 38 fails, requests may be redirected to another operable instance of controller application 38.

Figure 10:
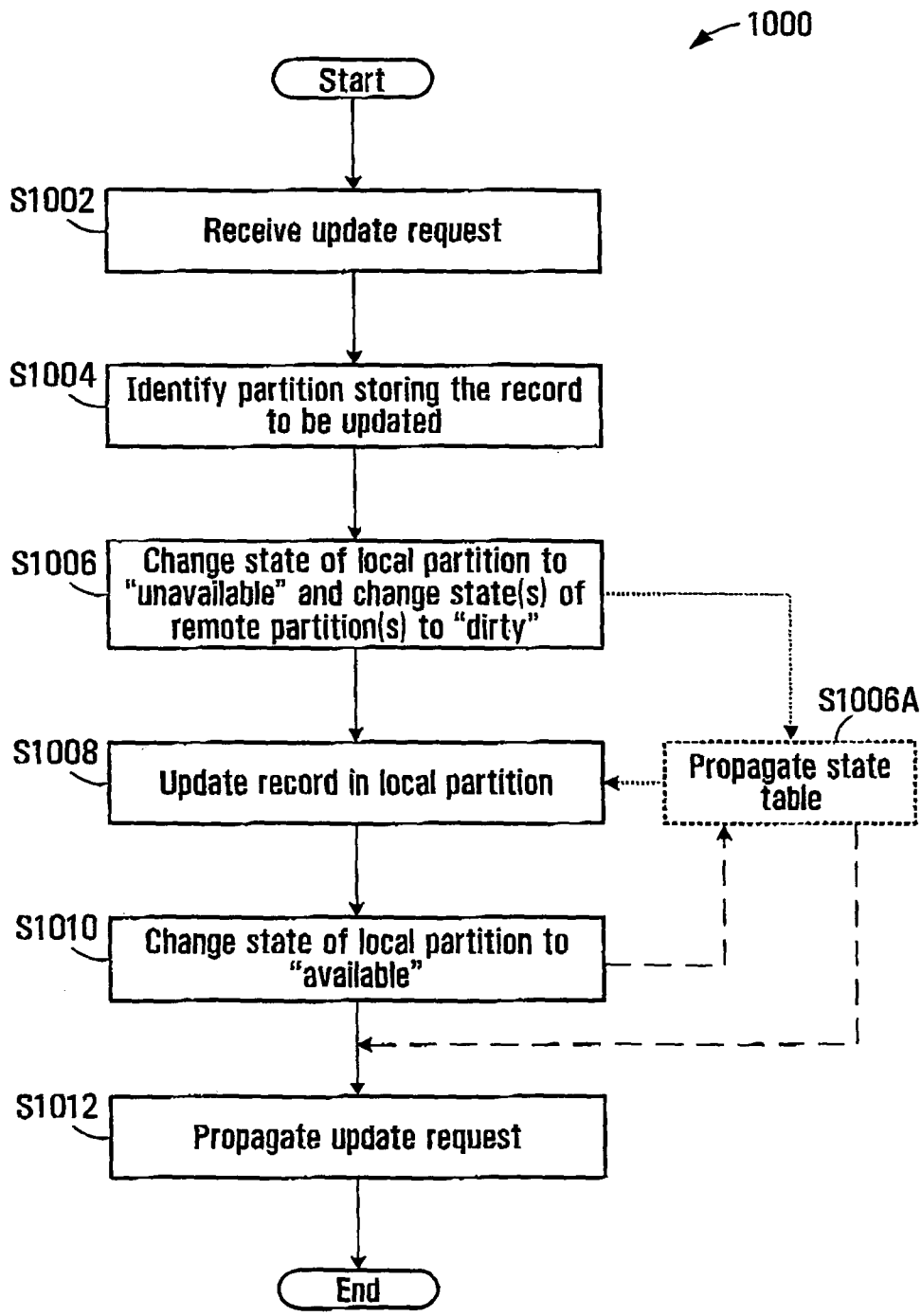
FIG. 10 is a flow chart depicting operation of the computer system of FIG. 3 upon receiving an update request.

The method of updating a record in database system 10 is described with reference to FIGS. 10, 11, and 12. Flow diagram 1000 (FIG. 10) depicts operation of load/update application 34 upon receiving an update request. Load/update application 34 may receive an instruction (e.g. in the form of an XML request) over network 100 to update a particular record (S1002) in database 40 from a user or from an application such as a database application, a data storage application, or the like.

Using the system state table, load/update application 34 may first identify the logical partition storing the record to be updated (S1004). Load/update application 34 may then change the state of the local partition to unavailable (indicating that the local instance of the partition storing the record is being updated) and change the state of remote instances of the partition to dirty (indicating that the partition(s) do not contain up-to-date data) (S1006).

Next, load/update application 34 may update (e.g. through database application 26) the record in the local instance of the partition (S1008). Upon completion of the update, load/update application 34 may change the state of the local instance of the partition to available thus indicating that records in the local instance of the partition are up-to-date (S1110).

Lastly, load/update application 34 may propagate the "update" request to the other database systems hosting the other remote instances of the partition (S1012).

Notably, changes to the state table may be propagated to other instances of the state table (S1006A) at other database systems after steps S1006 and S1010. Such changes may be propagated by, e.g. broadcasting a change request, or propagating a copy of the state table itself. Other methods of communicating changes to a copy of the state table to other copies of the state table may be apparent to those skilled in the art.

Figure 11:
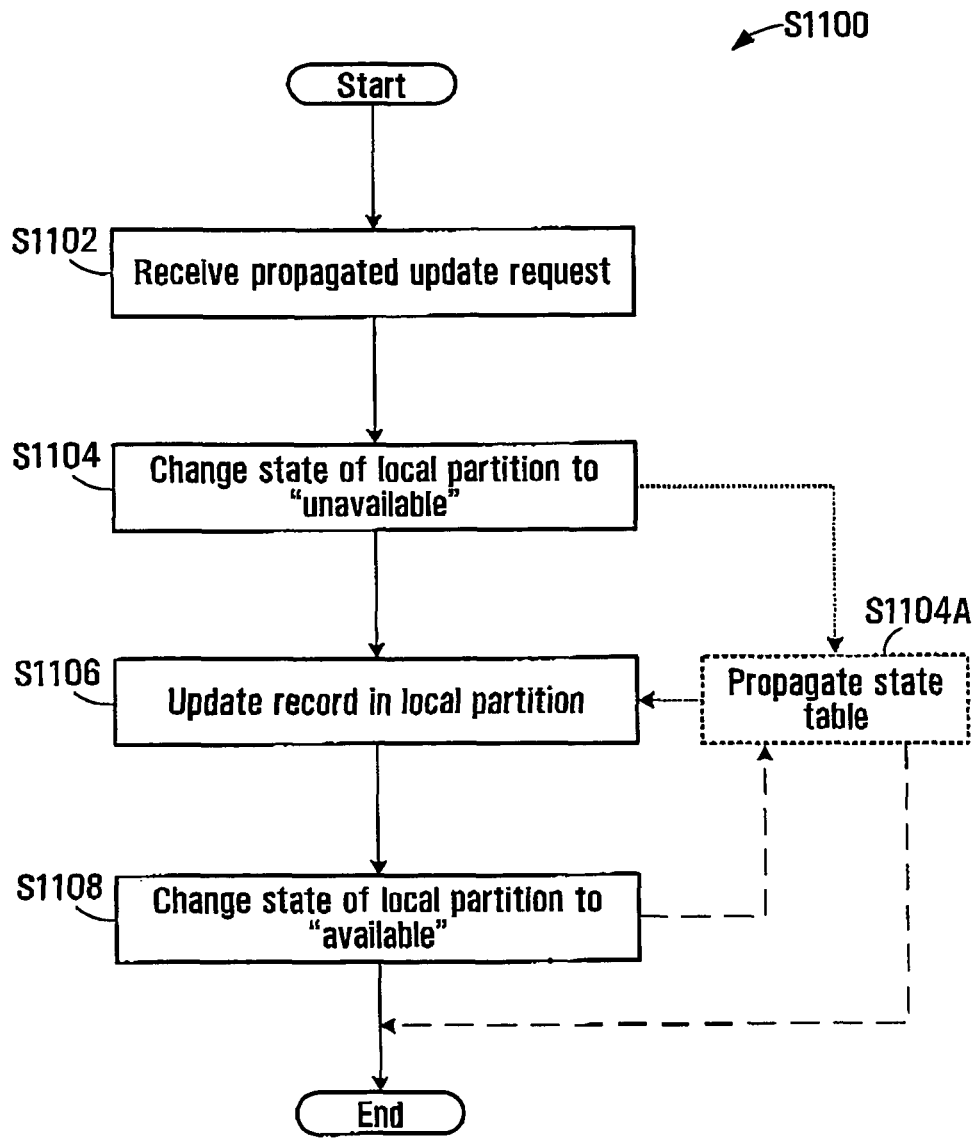
FIG. 11 is a flow chart depicting operation of the computer system of FIG. 3 upon receiving an update request propagated from a computer system of FIG. 2 or FIG. 3.

FIG. 11 depicts operation of load/update application 34 upon receiving an "update" request that has been propagated by another load/update application 34 at another database system. In this case, load/update application 34 receives a propagated update request (S1102) and changes the state of the local instance of the partition storing the record to be updated to "unavailable" (S1104). Next, load/update application 34 may update the record, via database application 26, in the local instance of the partition (S1106). Upon completion of the update, load/update application 34 may change the state of the local partition back to available (S1108). Changes to the state table may be propagated (S1104A) to other copies of the state table after steps S1104 and S1108.

Figure 12:
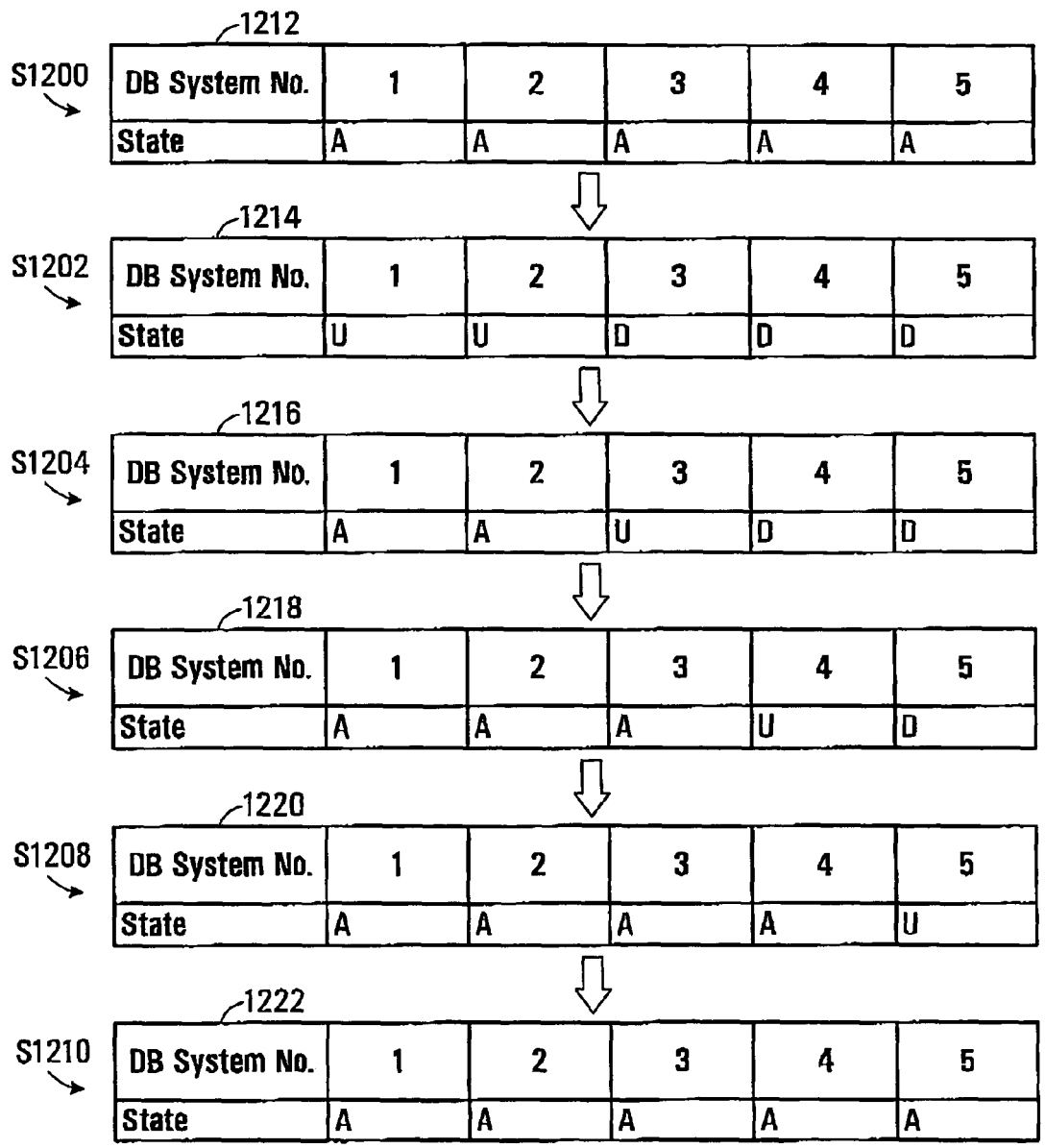
FIG. 12 illustrates an exemplary progression of an update of a database record across logical partitions in the database system of FIG. 1.

To further illustrate, FIG. 12 depicts an exemplary progression of an update to a record, e.g. record ID 0396 stored in Partition 4, in database system 10 from steps S1200 (initial state) to S1210 (completion of the update), across database systems 1-5.

At the initial state, S1200 (table 1212), all instances of Partition 4 are available.

At S1202 (table 1214) the instances of Partitions 4 at database systems 1 and 2 undergo the update (as indicated by the unavailable state). It may be appreciated that since database system 2 is a mirror of database system 1, the instances of Partition 4 at the two database systems may be updated simultaneously. However, the instances of Partition 4 at database systems 3, 4 and 5 are marked dirty thus indicating that these instances of Partition 4 are not up-to-date.

At time S1204 (table 1216), record ID 0396 has been updated, and the instances of Partition 4 at database systems 1 and 2 return to the available state. The update request may be next propagated (e.g. via an instruction sent over network 100) to database system 3, and accordingly, the instance of Partition 4 at database system 3 may be marked unavailable. The instances of Partition 4 at database systems 4 and 5 remain in the dirty state.

At S1206 (table 1218), record ID 0396 at Partition 4 at database system 3 has been updated and therefore this instance of Partition 4 returns to the active state. The update request may next be propagated to database system 4, and accordingly, the instance of Partition 4 at database system 4 may be marked unavailable.

At S1208 (table 1220), the update to record ID 0396 in Partition 4 at database system 4 is complete and the partition returns to the active state. The update request may lastly be propagated to database system 5. The instance of Partition 4 at database system 6 may accordingly be marked unavailable.

At S1210 (table 1222), all updates to all instances of Partition 4 (and hence, copies of record ID 0396) in database system 10 are complete and all instances of Partition 4 return to the active state.

Conveniently, because updates are propagated in a staggered manner (with the exception of mirrored partitions which may be, but need not necessarily be, updated simultaneously), at least one up-to-date copy of record ID 0396 may always be available in database system 10. Moreover, at least one copy of record ID 0396 may be available at all times, though all copies may not reflect the most recent update. Consequently, the need for locks may be obviated.

Figure 13:
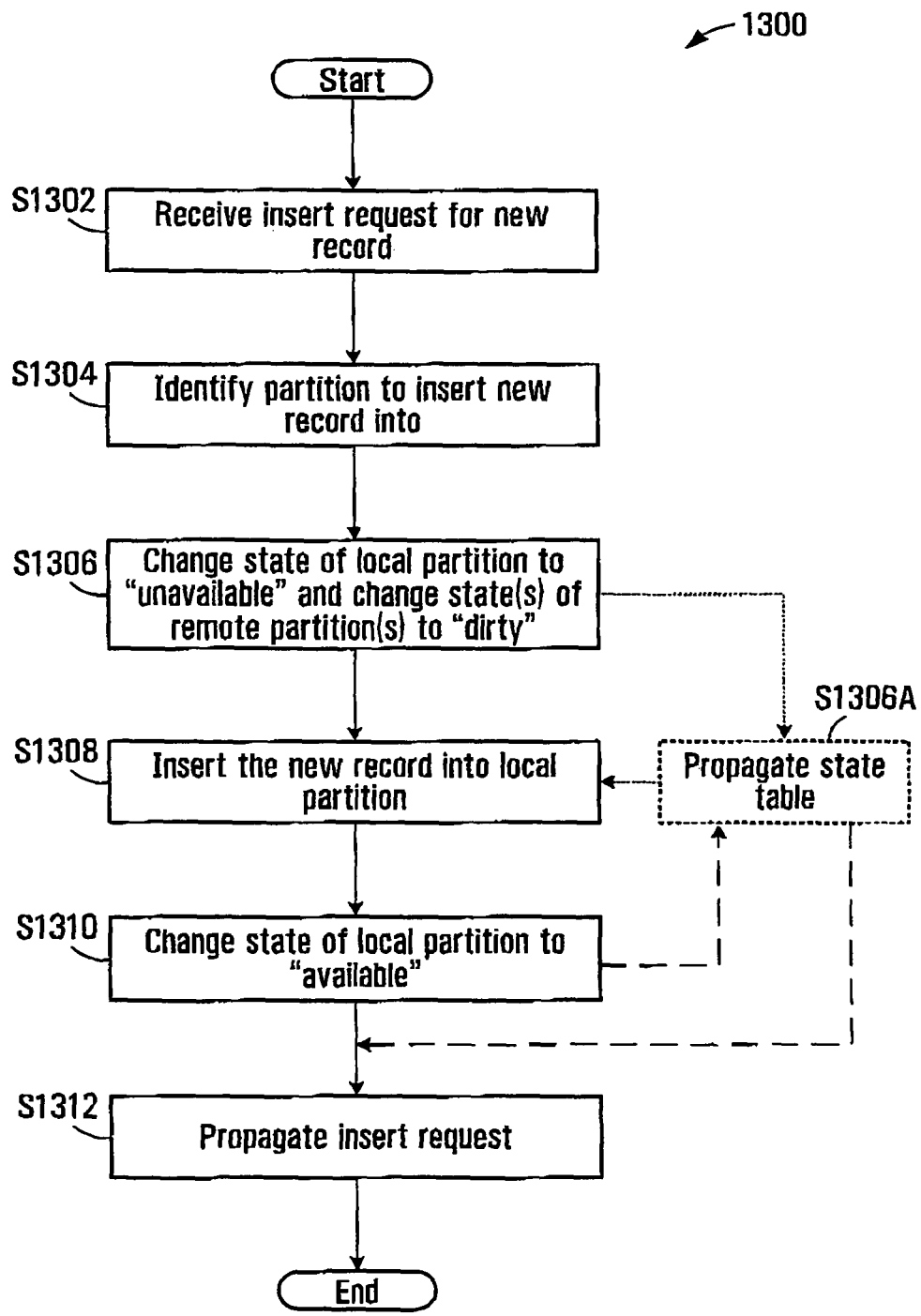
FIG. 13 is a flow chart depicting operation of the computer system of FIG. 3 upon receiving an insert request.
Figure 14:
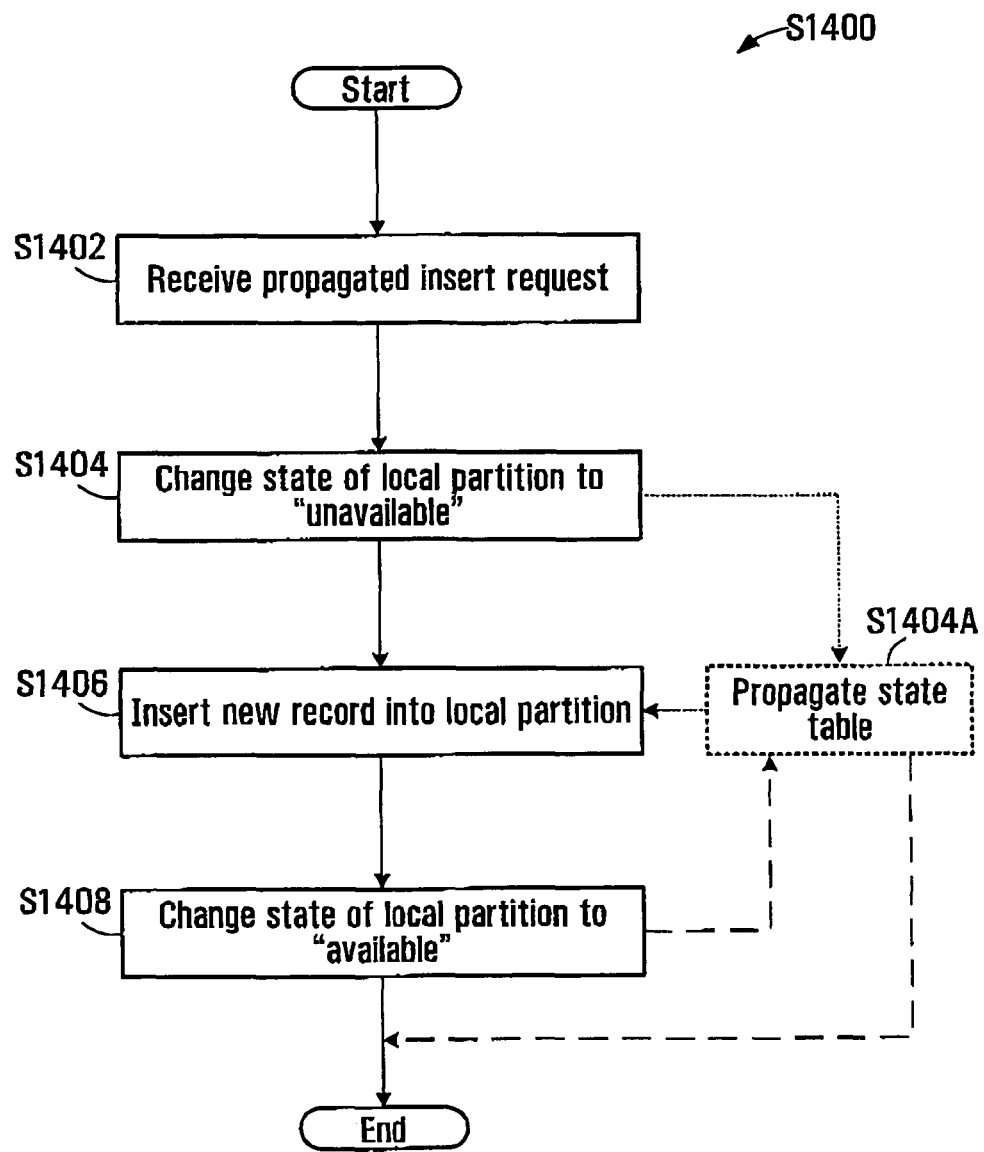
FIG. 14 is a flow chart depicting operation of the computer system of FIG. 3 upon receiving an insert request propagated from a computer system of FIG. 2 or FIG. 3.

The method of inserting a new record into database system 10 proceeds in a similar manner, as illustrated in flow diagrams 1300 and 1400 (FIGS. 13 and 14). Specifically, load/update application 34 receives a request to insert a new record (FIG. 13, S1302). Load/update application 34 then identifies which partition the new record will be inserted into (S1304). For example, new records may be added to the last partition, and if the last partition is full, then a new partition may be created. Other methods of identifying which partition a new record will be inserted into may be known to those skilled in the art.

Figure 9:
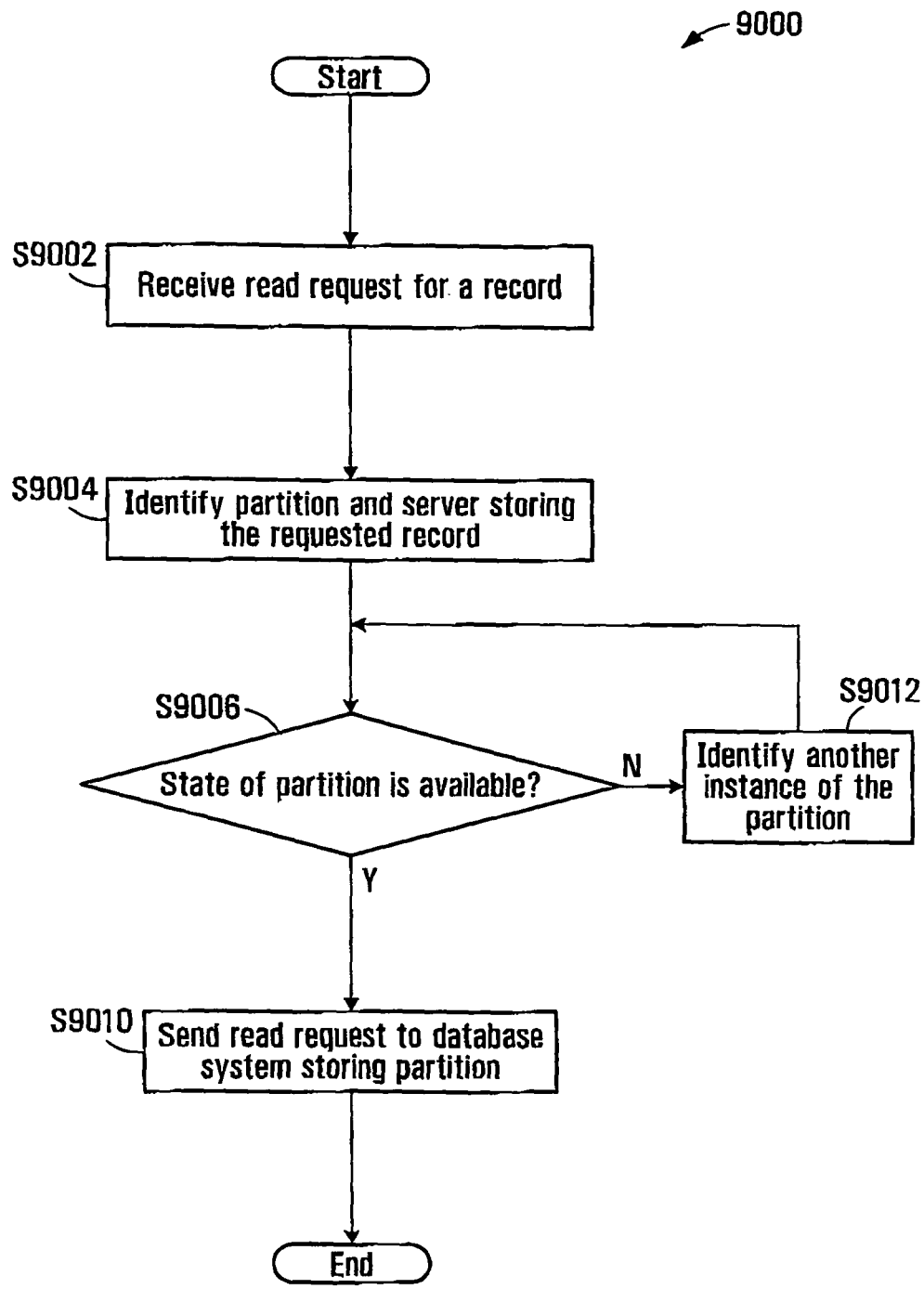
FIG. 9 is a flow chart depicting operation of the computer system of FIG. 3 upon receiving a read request.

Once the partition is identified, load/update application 34 may change the state of the local instance of the partition in the system state table to "unavailable" and the states of remote instances of the partition to "dirty" (S1306). It may be appreciated that should an instance of controller application 38 attempt to read a record that is awaiting insertion at an instance of the partition, the record may not yet exist. However, the requestor may be alerted that the partition is in the dirty state, and may therefore not reflect the most recent update to database 40. Conveniently, controller application 38 may then attempt to read from another instance of the partition that is available (ref. FIG. 9).

Next, the new record may be inserted into the local instance of the partition (S1308), via database application 26, and the state of the local instance of the partition changed to "available" (S1310).

Finally, the insert request may be propagated to other the database systems awaiting the insertion of the new record (S1312). Changes to the state table may be propagated to other copies of the state table (S1306A) after S1306 and S1310.

Upon receiving a propagated insert request, load/update application 34 (S1402) may change the state of the local instance of the partition to unavailable (S1404), may insert the new record into the local partition (S1406), via database application 26, and may change the state of the local partition back to available (S1408). Changes to the state table may be propagated to other copies of the state table (S1404A) after S1404 and S1408.

Having described the functions of controller application 38 and load/update application 34, it may be appreciated that each of computer systems 22 may host any number of operable instances of controller application 38 at each of database systems 1-5. In this manner, a plurality of read requests may be serviced concurrently. However, while multiple instances of load/update application 34 may also exist, only one instance of load/update application 34 may be operable at each of database systems 1-5. Load/update application 34 may only modify the copy of the system state table stored at the local database system. This is to ensure that the copies of the system state table at each of database systems 1-5 are modifiable by one application only, to minimize any difficulties that may arise with respect to concurrency control.

Moreover, to further minimize concurrency issues, an insert/update may proceed to completion across all database systems 1-5 in database system 10 before the next insert/update may be initiated. To this end, a flag may, for example, be kept in the system state table indicating that an insert/update is in progress. Only when the flag has been cleared, i.e. indicating that no inserts or updates are in progress, may the next insert/update be initiated by a load/update application 34. Other methods of ensuring that a load/update request proceeds to completion before the next insert/update is initiated may be apparent to those skilled in the art.

Other modifications to database system 10 may be possible without affecting the functionality described above, as known to those of ordinary skill.

For example, since each of computer systems 22 may be a conventional computer system, controller application 38 and load/update application 34 may be hosted on any one of computer systems 22, instead of on a separate computer system 24, as described above.

In another embodiment of the invention, instead of one load/update application 34 instance servicing inserts and updates of records at one database system as described above, (i.e. one operable instance of load/update application 34 per database system 1-6), an instance of a load/update application 34 operating at one of database systems 1-6, may instead be responsible for servicing a specific set of logical partitions across database system 10. That is, using the above example, one instance of load/update application 34 (e.g. operating at database system 1) may, for example, be responsible for servicing all instances of Partition 3 across database system 10. In this embodiment, when an insert or update request to Partition 3 is received by the load/update application 34, it may be responsible for inserting and updating records in all instances of Partition 3 (i.e. copies of Partition 3 at its local database system 1 and copies of Partition 3 at remote database systems 2, 3, 4 and 5). Load/update application 34, may update remote instances of Partition 3 by, for example, calling the relevant database applications 26 at the remote database systems. To minimize concurrency issues, each load/update application 34 may only modify the state(s) of the partition(s) under its responsibility.

In yet another embodiment of the invention, only one instance of load/update application 34 (the "master load/updater") may be operable across database system 10. In this alternate embodiment of system 10, controller application 38 may not propagate insert/update requests to other database systems (S1012, S1312), but the master load/updater may instead directly invoke the appropriate database application 26 at the relevant database system(s). Thus, the operations depicted in flow diagrams 1100 and 1400 would not be required.

In yet another embodiment of the invention, only one copy of the system state table may be maintained in database system 10, for example, at one of computer systems 22 or 24. In this embodiment, it may be desirable that there be only one operable instance of load/update application 34 (the "master load/updater") across database system 10 so as to minimize concurrency control difficulties, as detailed above. In this embodiment, changes to the system state table by load/update application 34 would not need to be propagated (i.e. steps S1006A, S1104A, S1306A and S1404A would not be needed) since only one copy of the system state table is maintained.

Conveniently, in all embodiments, should the computer system hosting the operable instances of applications 38 and 34 malfunction, another copy of applications 38 and 34 hosted on another computer system 22 or 24 in the database system may take over as the operable instance(s). It may be appreciated that this duplication increases the fault tolerance of each of database systems 1, 2, 3, 4 and 5 and of database system 10 as a whole.

Of course, the above-described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A distributed replicated database system storing a database having a plurality of records, said database system comprising:
    a plurality of federated database systems each storing a complete copy of said database, each federated database system comprising at least one server with said at least one server divided into at least one logical partition, said at least one logical partition containing at least some of said plurality of records in said database and all logical partitions at a federated database system cumulatively storing all of said plurality of records in said database; and
    a computing device hosting an application for updating said distributed replicated database system so that changes to said database are first stored in at least one copy of said database and then propagated to any other copies of said database, said computing device in communication with a computer readable medium storing a data structure, said data structure containing an indicator for each logical partition in each of said federated database systems of said plurality of federated database systems, each indicator indicating whether all those records in a given logical partition have been updated to reflect changes to those of said plurality of records in said database that are stored in said given logical partition, as a change in said database is propagated to each copy of said database in said plurality of federated database systems,
    wherein read requests for a given record may be serviced from any one of said plurality of federated database systems having a logical partition containing said given record where the indicator for that logical partition indicates that all records in that logical partition have been updated to reflect changes to those of said plurality of records in said database that are stored in that logical partition even if the indicator for another logical partition in another federated database system containing said given record indicates that all records in said another logical partition have not been updated to reflect changes to those of said plurality of records in said database stored in said another logical partition.

2. The distributed replicated database system of claim 1, wherein one of said plurality of federated database systems comprises said computer readable medium.

3. The distributed replicated database system of claim 1, wherein a copy of said data structure is stored at each of said plurality of federated database systems and updates to a data structure at one of said plurality of federated database systems are propagated to other copies of said data structure.

4. The distributed replicated database system of claim 1, wherein each of said at least one server hosts a database management system.

5. The distributed replicated database system of claim 1, wherein said plurality of said federated database systems are interconnected by a computer communications network.

6. The distributed replicated database system of claim 1, wherein said data structure contains an association between said at least one logical partition and said at least one server.

7. The distributed replicated database system of claim 1, wherein said data structure contains an indicator of the records of said database that are contained in each of said at least one logical partition, across said federated database systems.

8. A method of updating a record in a distributed replicated database system storing a database having a plurality of records, said database system comprising:
a plurality of federated database systems each storing a complete copy of said database, each federated database system comprising at least one server with said at least one server divided into at least one logical partition, said at least one logical partition containing at least some of said plurality of records in said database and all logical partitions at a federated database system cumulatively storing all of said plurality of records in said database; and
a computing device hosting an application for updating said distributed replicated database system so that changes to said database are first stored in at least one copy of said database and then propagated to any other copies of said database, said computing device in communication with a computer readable medium storing a data structure, said data structure containing an indicator for each logical partition in each of said federated database systems of said plurality of federated database systems, each indicator indicating whether all those records in a given logical partition have been updated to reflect changes to those of said plurality of records in said database that are stored in said given logical partition, as a change in said database is propagated to each copy of said database in said plurality of federated database systems, wherein said method comprises:
receiving an instruction to update a record;
identifying from said data structure all logical partitions across said plurality of federated database systems in said replicated database system storing said record;
modifying said data structure to indicate that said all logical partitions across said plurality of federated database systems storing a copy of said record are not up-to-date;
updating said record at a first federated database system; and
modifying said data structure to indicate that the logical partition at said first federated database system storing said record is up-to-date
wherein read requests for said record may be serviced from said logical partition at said first federated database system once said data structure indicates that that logical partition is up-to-date even if the indicator for another of said all logical partitions across said plurality of federated database systems storing a copy of said record indicates that all records in said another logical partition are not up-to-date.

9. The method of claim 8, further comprising:
updating said record at all other logical partitions that are not up-to-date; and
modifying said data structure to indicate that all other logical partitions storing across said plurality of federated database systems said record are up-to-date.

10. The method of claim 8, wherein a copy of said data structure is stored at each of said plurality of federated database systems, and wherein said modifying said data structure further comprises propagating said modification to said data structure to all copies of said data structure.

11. The method of claim 8, wherein a copy of said data structure is stored at each of said plurality of federated database systems, and wherein said modifying said data structure further comprises propagating said modification to said data structure to all copies of said data structure.

12. The method of claim 9, wherein a copy of said data structure is stored at each of said plurality of federated database systems, and wherein said modifying said data structure further comprises propagating said modification to said data structure to all copies of said data structure.

13. The method of claim 9, wherein said updating said record at all other logical partitions that are not up-to-date comprises sending an update request to the federated database systems hosting said not-up-to-date partitions.

14. A method of reading a record in a distributed replicated database system storing a database having a plurality of records, said database system having a plurality of federated database systems each storing a complete copy of said database, each federated database system comprising at least one server with said at least one server divided into at least one logical partition, said at least one logical partition containing at least some of said plurality of records in said database and all logical partitions at a federated database system cumulatively storing all of said plurality of records in said database, and a computing device hosting an application for updating said distributed replicated database system so that changes to said database are first stored in at least one copy of said database and then propagated to any other copies of said database, said computing device in communication with a computer readable medium storing a data structure, said data structure containing an indicator for each logical partition in each of said federated database systems of said plurality of federated database systems, each indicator indicating whether all those records in a given logical partition have been updated to reflect changes to those of said plurality of records in said database that are stored in said given logical partition, as a change in said database is propagated to each copy of said database in said plurality of federated database systems, wherein said method comprises:
at a first federated database system, receiving an instruction to read a record;
identifying an up-to-date logical partition for servicing said read, said identifying comprising selecting, based on said data structure, a logical partition storing said record where the indicator for that logical partition indicates that all records in that logical partition have been updated to reflect changes to those of said plurality of records in said database that are stored in that logical partition; and
reading said record from a server storing said up-to-date logical partition,
wherein the instruction to read a record may be serviced even if the indicator for another logical partition in another federated database system containing said given record indicates that all records in said another logical partition have not been updated to reflect changes to those of said plurality of records in said database stored in said another logical partition.

15. The method of claim 14, wherein where said up-to-date logical partition storing said record is not located at said first federated database system, said reading said record comprises sending a read request to the federated database system hosting said up-to-date logical partition.

16. A method of inserting a record into a distributed replicated database system storing a database having a plurality of records, said database system comprising:
a plurality of federated database systems each storing a complete copy of said database, each federated database system comprising at least one server with said at least one server divided into at least one logical partition, said at least one logical partition containing at least some of said plurality of records in said database and all logical partitions at a federated database system cumulatively storing all of said plurality of records in said database; and a computing device hosting an application for updating said distributed replicated database system so that changes to said database are first stored in at least one copy of said database and then propagated to any other copies of said database, said computing device in communication with a computer readable medium storing a data structure, said data structure containing an indicator for each logical partition in each of said federated database systems of said plurality of federated database systems, each indicator indicating whether all those records in a given logical partition have been updated to reflect changes to those of said plurality of records in said database that are stored in said given logical partition, as a change in said database is propagated to each copy of said database in said plurality of federated database systems, wherein said method comprises:

receiving an instruction to insert a record;

identifying all logical partitions in said replicated database system into which said record is to be inserted; and modifying said data structure to indicate that said all logical partitions across said plurality of federated database systems into which said record is to be inserted are not up-to-date;

inserting said record at a first federated database system; and modifying said data structure to indicate that the logical partition at said first federated database system into which said record was inserted is up-to-date wherein read requests for said record may be serviced from said logical partition at said first federated database system once said data structure indicates that that logical partition is up-to-date even if the indicator for another of said all logical partitions across said plurality of federated database systems storing a copy of said record indicates that all records in said another logical partition are not up-to-date.

17. The method of claim 16, further comprising:
inserting said record at all other logical partitions that are not up-to-date; and
modifying said data structure to indicate that all other logical partitions into which said record were inserted are up-to-date.

18. The method of claim 16, wherein a copy of said data structure is stored at each of said plurality of federated database systems, and wherein said modifying said data structure further comprises propagating said modification to said data structure to all copies of said data structure.

19. The method of claim 16, wherein a copy of said data structure is stored at each of said plurality of federated database systems, and wherein said modifying said data structure further comprises propagating said modification to said data structure to all copies of said data structure.

20. The method of claim 17, wherein a copy of said data structure is stored at each of said plurality of federated database systems, and wherein said modifying said data structure further comprises propagating said modification to said data structure to all copies of said data structure.

21. The method of claim 17, wherein said inserting said record at all other logical partitions that are not up-to-date comprises sending an insert request to the federated database systems hosting said not-up-to-date partitions.

22. Computer readable medium storing processor executable instructions that when loaded at a computing device comprising a processor, cause said computing device to perform the method of claim 1.

23. Computer readable medium storing processor executable instructions that when loaded at a computing device comprising a processor, cause said computing device to perform the method of claim 8.

24. Computer readable medium storing processor executable instructions that when loaded at a computing device comprising a processor, cause said computing device to perform the method of claim 14.

25. Computer readable medium storing processor executable instructions that when loaded at a computing device comprising a processor, cause said computing device to perform the method of claim 16.

26. The distributed replicated database system of claim 1, wherein said indicator for each partition further indicates whether records in a given logical partition are currently being updated, and that the given partition is therefore not available.

27. The method of claim 8, wherein each said indicator further indicates whether records in a given logical partition are currently being updated, and that the given logical partition is therefore not available.

28. The method of claim 14, wherein each said indicator further indicates whether records in a given logical partition are currently being updated, and that the given logical partition is therefore not available.

29. The method of claim 16, wherein each said indicator further indicates whether records in a given logical partition are currently being updated, and that the given logical partition is therefore not available.

* * * * *